June 12, 1951 — G. PRODROMOS — 2,556,397

HOLDER FOR TRIMMING TOOLS

Filed March 2, 1950 — 2 Sheets-Sheet 1

Inventor
George Prodromos

By Clarence A. O'Brien
and Harvey B. Jacobson
Attorneys

June 12, 1951      G. PRODROMOS      2,556,397
HOLDER FOR TRIMMING TOOLS
Filed March 2, 1950      2 Sheets-Sheet 2
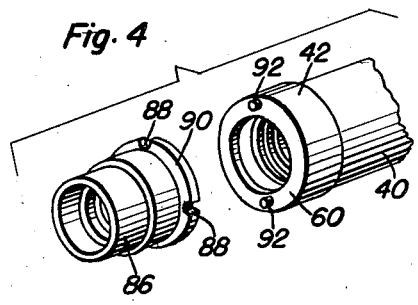
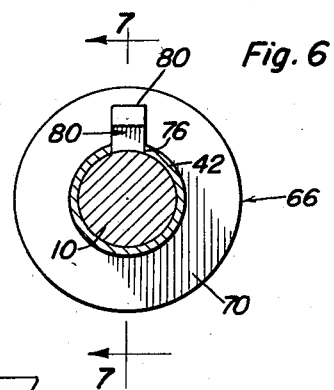
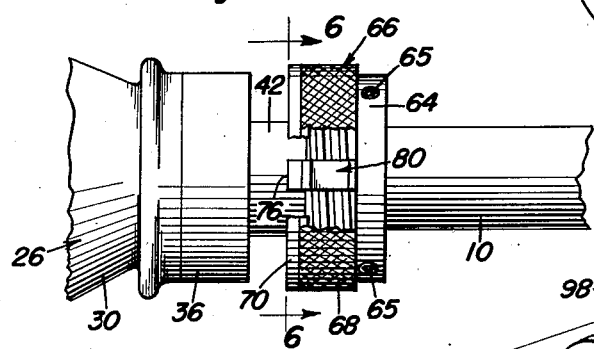
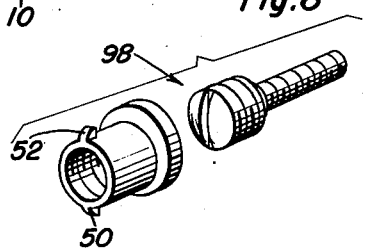
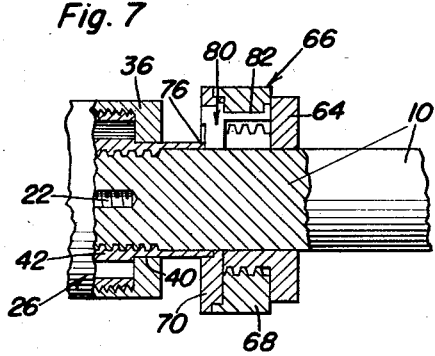
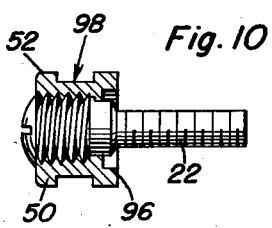
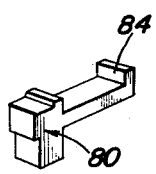
Inventor
George Prodromos Patented June 12, 1951

2,556,397

UNITED STATES PATENT OFFICE 2,556,397

HOLDER FOR TRIMMING TOOLS

George Prodromos, Winston-Salem, N. C.

Application March 2, 1950, Serial No. 147,221

4 Claims. (Cl. 12—88)

This is a continuation-in-part of my copending application, Serial No. 793,792, which was filed on December 26, 1947 and which issued as Patent No. 2,529,963 on November 14, 1950.

An object of this invention is to provide an improved tool holder or cutter holder assembly which is to be used for the purposes specified in my copending application and which includes an improved structural assembly for releasably retaining a cutter on the cutter holder, there being adapted the use of a left-hand thread on a locking element and a right-hand thread on another locking element, which elements are adapted to be brought together in locking engagement upon rotation of these elements in the same direction to thereby lock the cutter holder fixed with the shaft. In this manner, the cutter holder and hence the cutter which is in nested relation therewith cannot rotate with respect to the shaft in at least one direction. In order to release the cutter from its holder, rotation of the threaded elements in the opposite direction separates them from locking engagement whereby, upon urging the cutter and its holder axially with respect to the shaft, the end lock plate may be removed from the cutter and the cutter removed for replacement, repair, or for any other purpose.

Other objects will become apparent in following the description and in viewing the drawings, wherein:

Figure 4 is an exploded perspective view of the ends of a sleeve which is employed in the device and a locking member which is operated by this sleeve;

Figure 5 is a fragmentary elevational view of the device, portions being broken away to show the key and its connection with said sleeve and a means of operating the sleeve;

Figure 6 is a sectional view taken substantially along the line 6—6 of Figure 5 and in the direction of the arrows;

Figure 7 is a sectional view taken substantially along the line 7—7 of Figure 6 and in the direction of the arrows;

Figure 8 is an exploded perspective view of the modified form of the invention, illustrating a second suggested mode of manufacture of the stud;

Figure 9 is a perspective view of the key which is employed to couple the sleeve and its operating means; and Figure 10 is a sectional view of the assembly in Figure 8.

Figure 3:
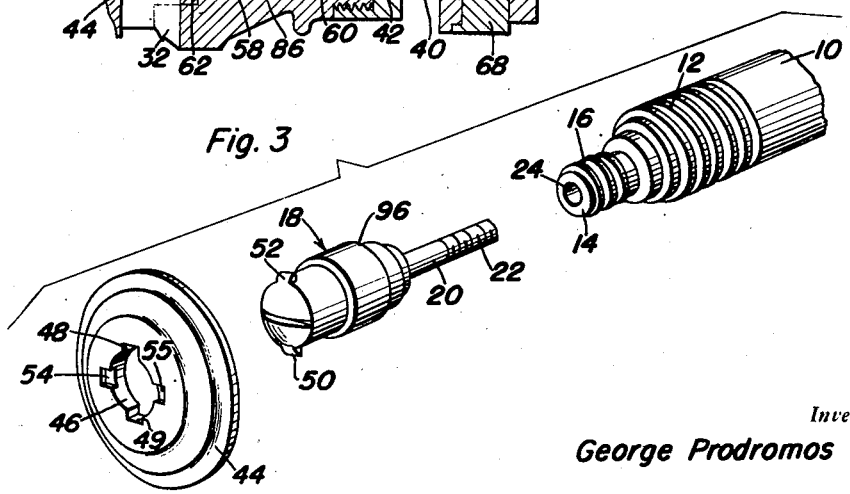
Figure 3 is an exploded perspective view of some of the locking elements used in the assembly.

A shaft 10 which is adapted to be rotated by conventional shoe machinery is illustrated in the drawings. This shaft has threads 12 (Figure 3) adjacent one end thereof. An axial extension 14 extends from the threaded end of the shaft 10 and has threads 16 thereon. The threads 12 and 16 are similar in that they are either right-hand or left-hand threads. A stud 18 including a head and a shank 20 is adapted to be employed in connection with the shaft 10. This stud is threaded, as at 22, these threads being reversed with respect to the threads 12 and 16. The bore 24 which is in the shaft 10 and the extension 14 is appropriately threaded to accommodate the threads 22 of the shank 20.

A holder 26 for the cutting tool or cutter 28 is disposed in concentric relation with respect to the shaft 10. This holder has a burnishing surface 30 and teeth 32 which are adapted to be fitted between the teeth of the cutter 28 in order to prevent relative rotation between the cutter 28 and the holder 26. The inner end of the holder 26 has a collar 36 threaded thereon, a flange 38 projecting inwardly from the collar 36.

The flange 38 is disposed on the reduced section 40 of the sleeve 42 and is adapted to engage the abutment formed at the junction of the reduced section 40 and the remainder of the sleeve. This mounts the holder 26 on the shaft 10 for rotation.

An end or locking plate 44 is disposed at the outer end of the holder 26 and has a central aperture 46 therein. This central aperture has laterally projecting slots 48 and 49 which are used for the purpose of permitting the plate 44 to pass over the ears 50 and 52 on the head of the stud 18. Similarly shaped recesses 54 and 55 are provided in the outer surface of the plate 44 in order to lock the plate 44 to the stud 18 by disposition of the ears 50 and 52 therein.

By this construction, the plate 44 may be removed from the assembly by pressing it inwardly and rotating it with respect to the stud so that the ears 50 and 52 are removed from the recesses 54 and 55 and placed in the slots 48 and 49. Then, the plate 46 is simply lifted from the assembly.

Figure 1:
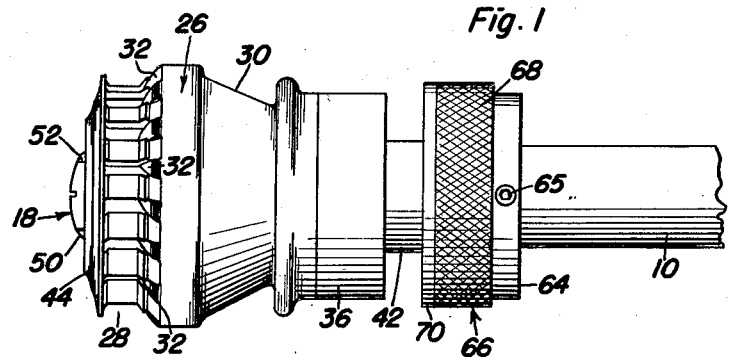
Figure 1 is an elevational view of the device showing it applied to a conventional shoe machinery shaft.
Figure 2:
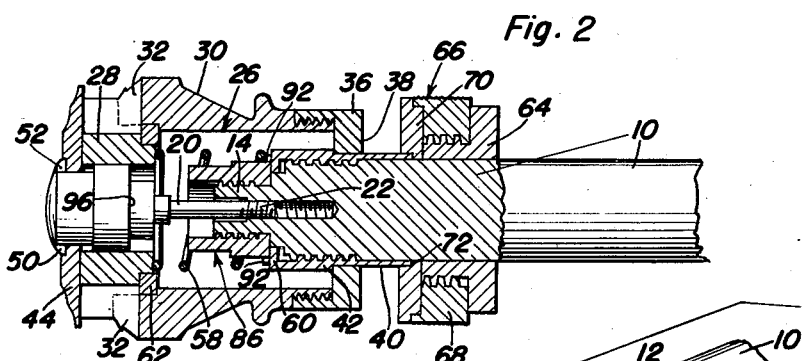
Figure 2 is a longitudinal sectional view of the structure shown in Figure 1.

A spring 58 has one end resting on the inside surface of the cutter 28 and the other end seated on the inwardly extending flange 60 of the sleeve 42. Therefore, when the plate 44 is pressed inwardly, the cutter 28 and head 26 are moved inwardly against the opposing force of the spring 58. This permits the removal of the plate 44 and cutter 28 inasmuch as the holder 26, cutter 28 and plate 44 are moved inwardly and axially with respect to the shaft 10, while the stud 18 remains stationary. A bushing 62 (Figure 2) is disposed on a shoulder formed in the holder 26 to form a bearing surface for the cutter 28.

Means for locking the cutter 28 with respect to the shaft 10 is provided in the assembly. This is accomplished by locking the head of the stud 18 with respect to the sleeve 42. The specific structure for accomplishing this function is the collar 64 which is held in axially adjusted positions on the shaft 10 by means of the set screws 65. The collar 64 is externally threaded, while the operator 66 is internally threaded and disposed on the last-mentioned threads. The operator consists of an outer sleeve 68 which has the threads thereon and a closure ring 70 concentrically arranged on the shaft 10. This closure ring has a shoulder 72 formed by a recess cut in the outer face thereof, the shoulder being engaged by the inner end of the sleeve 42. Therefore, when the knurled outer surface of the operator is rotated, the operator moves outwardly of the shaft 10.

A notch 76 is cut in the sleeve 40 to accommodate the key 80 (Figure 9). A groove 82 is cut in the operator accommodating another portion of the key. The upwardly extending leg 84 of the key is disposed in an appropriate recess formed in the notch 82 so that the key rotates with the operator.

Accordingly, when the operator is rotated, it will not only move axially with respect to the shaft 10 but will also cause the sleeve 42 to be rotated on the shaft. This rotation of the sleeve moves it axially.

A locking element 86 (Figure 4) is threaded on the extension 14 and has a plurality of notches 88 formed in the periphery of a flange 90 thereof. Small pins 92 which project from the flange 60 of the sleeve 42 are disposed in the recesses 88, thereby causing the locking element 86 to rotate as a direct result of rotation of the operator 66. Hence, since the threads 12 and the threads 16 are of the same pitch and are formed in the same direction, the locking element 86 is caused to move axially with respect to the shaft 10 as the sleeve 42 is rotated.

However, at the same time, the stud 18 is caused to be rotated in the same direction through the action of the spring 58 reacting on the sleeve and the cutter. The frictional bond between the various elements shown in Figure 3 and receiving direct reaction from the spring 58 rotate these elements as an assembled unit, carrying with them the holder 26. Since the threads 22 are in the opposite direction from the threads 12 and 16, the stud 18 will be caused to move in an axial direction with respect to the shaft 10 but in the direction opposite from the axial movement of the locking element 86.

After a small amount of rotation of the operator 66, the shoulder 96 of the head of the stud 18 presses against the outer end of the locking element 86, causing a binding action. This locks the cutter 8 and the holder 26 so that there can be no further rotation of the assembly with respect to the shaft 10, at least in one direction, which direction is the necessary one causing the teeth of the cutter to be operative on a shoe sole or the like.

Inasmuch as the elements of the locking assembly have been locked together by axial movements thereof, the spring 58 becomes compressed. At the point where the spring will be compressed no further, the shoulder 96 is resting against and locked against the outer end of the locking element 86. Accordingly, pressure on the plate 44 inwardly of the shaft 10 will be unavailing to release the cutter 28 from its holder 26. Thus, the cutter cannot be removed while the elements are in this condition, it being necessary to intentionally and positively rotate the operator 66 to loosen the locking elements and allow the plate 44 to be pressed inwardly for manual release of the cutter 28.

Reference is now made to Figure 8 wherein there is the disclosure that the stud 98 may be made in two parts rather than one integral element. As to function and operation, the stud 98 is identical to the stud 18. Other variations may be made in the invention without departing from the inventive concept.

Having described the invention, what is claimed as new is:

1. A clamp for a shoe machinery cutter comprising a shaft having threads at one end and on the outside thereof, an axial extension projecting from the threaded end of said shaft, a stud with a head having lateral ears and a shank, a cutter holder, means mounting said cutter holder on said shaft, a cutter lock plate with an opening disposed on said head and held by said ears, a cutter held by said holder and engaging said plate, a spring reacting on said shaft and pressing said cutter outwardly of said shaft, said shank being threaded in said shaft by threads which are reverse from the threads on the outside of said shaft, said holder mounting means comprising a threaded sleeve on said shaft threads with means retaining said holder thereon, a locking element disposed on said extension and moved axially of said shaft when said sleeve is threaded outwardly of said shaft, and said locking element frictionally locking said head when said sleeve is moved outwardly preventing relative rotation of said holder and said shaft.

2. A clamp for a shoe machinery cutter comprising a shaft having threads at one end and on the outside thereof, an axial extension projecting from the threaded end of said shaft, a stud with a head having lateral ears and a shank, a cutter holder, means mounting said cutter holder on said shaft, a cutter lock plate with an opening disposed on said head and held by said ears, a cutter held by said holder and engaging said plate, a spring reacting on said shaft and pressing said cutter outwardly of said shaft, said shank being threaded in said shaft by threads which are reverse from the threads on the outside of said shaft, said holder mounting means comprising a threaded sleeve on said shaft threads with means retaining said holder thereon, a locking element disposed on said extension and moved axially of said shaft against the opposing force of said spring when said sleeve is threaded outwardly of said shaft, and said locking element lockingly engaging said head forming a lock which retains said holder fixed to said shaft through said plate and cutter and which prevents further compression of said spring.

3. A clamp for a shoe machinery cutter comprising a shaft having threads at one end and on the outside thereof, an axial extension projecting from the threaded end of said shaft, a stud with a head having lateral ears and a shank, a cutter holder, means mounting said cutter holder on said shaft, a cutter lock plate with an opening disposed on said head and held by said ears, a cutter held by said holder and engaging said plate, a spring reacting on said shaft and pressing said cutter outwardly of said shaft, said shank being threaded in said shaft by threads which are reverse from the threads on the outside of said shaft, said holder mounting means comprising a threaded sleeve on said shaft threads with means retaining said holder thereon, a locking element disposed on said extension and moved axially of said shaft when said sleeve is threaded outwardly of said shaft, said locking element frictionally locking said head when said sleeve is moved outwardly preventing relative rotation of said holder and said shaft, and means including a collar axially adjustably secured to said shaft and an operator on said collar for rotating said sleeve on said shaft.

4. A clamp for a shoe machinery cutter comprising a shaft having threads at one end and on the outside thereof, an axial extension projecting from the threaded end of said shaft, a stud with a head having lateral ears and a shank, a cutter holder, means mounting said cutter holder on said shaft, a cutter lock plate with an opening disposed on said head and held by said ears, a cutter held by said holder and engaging said plate, a spring reacting on said shaft and pressing said cutter outwardly of said shaft, said shank being threaded in said shaft by threads which are reverse from the threads on the outside of said shaft, said holder mounting means comprising a threaded sleeve on said shaft threads with means retaining said holder thereon, a locking element disposed on said extension and moved axially of said shaft against the opposing force of said spring when said sleeve is threaded outwardly of said shaft, said locking element lockingly engaging said head forming a lock which retains said holder fixed to said shaft through said plate and cutter and which prevents further compression of said spring, an externally threaded collar secured to and arranged for axial adjustment on said sleeve, an operator threaded on said threaded collar, and a key connecting said sleeve and said operator to thereby couple said operator and said sleeve for rotation.

GEORGE PRODROMOS.

REFERENCES CITED

The following references are of record in the file of this patent:

UNITED STATES PATENTS

| Number | Name | Date |
|---|---|---|
| 2,162,944 | Dunford | June 20, 1939 |
| 2,230,136 | Dunford | Jan. 28, 1941 |